3,275,723
PROCESS AND APPARATUS FOR MANUFACTURING TUBULAR FILMS OF SYNTHETIC THERMOPLASTIC MATERIALS
Vittorio E. Cappuccio, Milan, Italy, assignor to Montecatini Societa Generale per l'Industria Mineraria e Chimica, Milan, Italy
Filed June 9, 1964, Ser. No. 373,767
Claims priority, application Italy, June 20, 1963, 13,073/63
9 Claims. (Cl. 264—70)

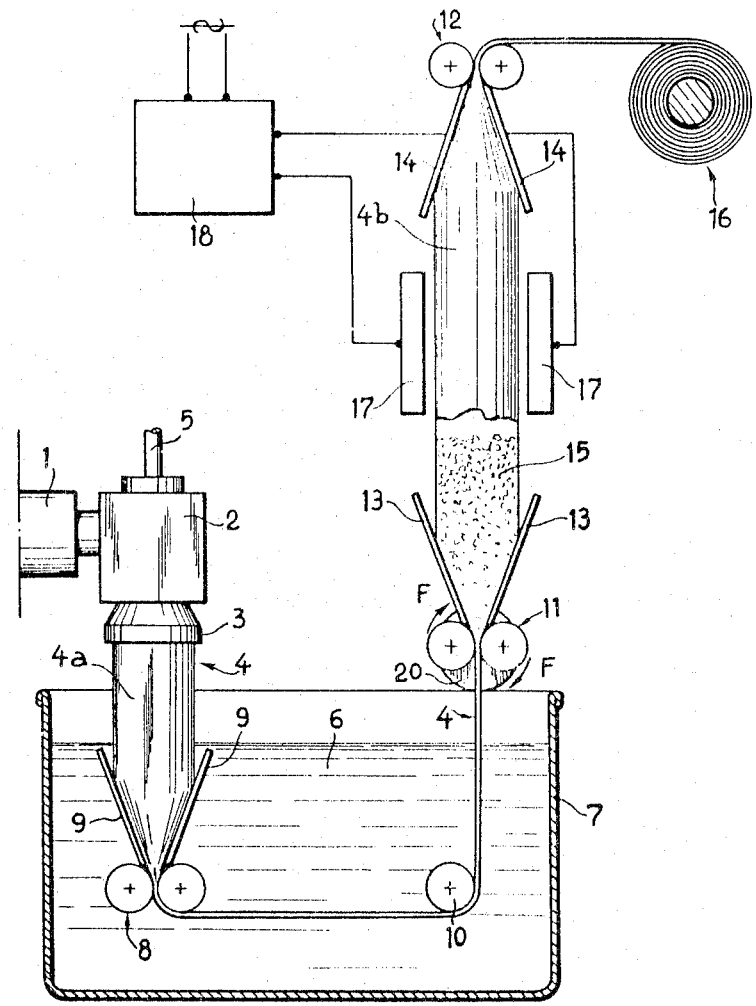

This invention relates to that system of manufacturing tubular films of synthetic thermoplastic materials (e.g., polypropylene) wherein a heat-softened thermoplastic material is extruded as tubular film from an annular nozzle into a quenching bath, such as cold water, whereupon the solidified film issuing from the bath is either wound-up on a reel for storage, or directly utilized for packaging goods, for example, or else further processed, if necessary.

Generally, the tubular film travels through the bath in flattened (collapsed) condition and is opened to its proper tubular condition at the time of the utilization only, for example at a filling station of a packaging machine.

It has been found that tubular films so manufactured ordinarily contain minute droplets of the quenching liquid adhering to the inner film surface. The presence of such droplets is undesirable for many reasons. So, for example, many goods do not tolerate water or humidity; moreover, as the film is handled by a packaging machine, water droplets contained therein easily adhere to the handling tools and give rise to rust; still moreover, also the appearance of the film is unduly affected by said droplets. The presence of the droplets in the film tubing is apparently mainly due to penetration of the quenching liquid into the open leading end of the tubing at the start of the manufacturing process; another reason apparently resides in condensation of humidity in the tubing as the latter is quenched from, say, about 200°–250° C. to the cold water temperature (about 20° C.).

A general object of this invention is to provide an improved method and an apparatus by which a droplet-free tubular film can be successfully produced.

The method of this invention comprises extruding a heat-softened thermoplastic material as a tubular film into a liquid quenching bath and pulling said film through the bath in collapsed condition, and is characterized in that, as the collapsed film is pulled out of the bath in an at least sub-vertical direction, a spatially stationary bubble of said film, extending in said at least sub-vertical direction, is formed and maintained during the extrusion process, and vibrations are applied to said bubble in a direction substantially transverse to the length thereof to thereby dislodge any droplets of liquid from the inner surface of the bubble and collect them in a bottom section of the latter.

Advantageously, the bottom section at least, of said bubble is filled with an absorbant in particulate form, such as silica-gel, anhydrous sodium sulfate, magnesium sulfate, potassium carbonate, anhydrous copper sulfate, activated alumina; the particulate form is advantageously granular, obtained by pelletizing the material before use. The term "absorbant" as used herein means both absorbant and adsorbant materials for the liquid.

As a length of the so processed tubular film has been wound-up on a storage reel (or consumed directly for packaging or other use), the film tubing is severed, either for replacement of the absorbant or for evacuation of the water-pool formed in the meantime in the bottom section of the bubble should the absorbant not be used, whereupon the process is re-started.

The vibrations can be applied to the bubble by any suitable means. According to a preferred embodiment, electro-acoustical transducers are employed, energized at a supersonic frequency by an electrical oscillator unit. The transducers are advantageously in the form of plates surrounding at least part of the circumference of the bubble. However, also electromagnetically or mechanically operated vibrators can be used, if desired.

In the accompanying drawing, reference numeral 1 indicates an extrusion press comprising a cross-head 2 having a downwardly directed annular extrusion die 3. A heat-softened thermoplastic film tubing 4 is extruded downwardly from the die while being blown to a bubble 4a by means of air or other gas (e.g., nitrogen), supplied through a conduit 5 and a "torpedo" in the head 2, as is conventional in the art. It is also known that such an extrusion-blowing process stretches the heat-softened film and a bi-orientated molecular structure of the material is obtained in this way; this is particularly important where isotactic polypropylene is used as thermoplastic material.

The just extruded and blown film tubing is quenched in a water bath 6 contained in a tank 7 placed beneath the die 3. The quenched tubing is pulled in a collapsed condition by means of a pair of pinch rolls 8, operating in the bath and having associated therewith a pair of collapsers 9, as is conventional in the art. The collapsed film tubing travelling in the bath is deflected vertically upwardly around a guide roll 10 and is taken-up by a further pair of pinch rolls 11, placed above the tank 7. A still further pair of pinch rolls 12 is arranged vertically above the pair 11 an appreciable distance from the latter, thereby to define a vertically directed section of the path for the tubing 4, on the length of which the tubing is expanded to form a vertically elongated bubble 4b. A pair of de-collapsers 13 are associated with the lower pair of pinch rolls 11 to assist the tubing in forming the bubble 4b, and a pair of collapsers 14 are associated with the upper pair of pinch rolls 12 acting similarly to collapsers 9. A gas such as air is contained in the bubble 4b and a charge 15 of a pelletized absorbant is contained in a bottom section of the bubble, the escape of both air and absorbant being prevented by the pinch rolls 11 and 12. The tubing issuing from between the upper pair of pinch rolls 12 is wound-up on a reel 16.

Two ultrasonic electro-acoustical transducers 17, 17, are arranged at diametrically opposite sides of the bubble 4b at a location about mid-way between the pairs of pinch rollers 11, 12, and above the charge 15, said transducers being energized by an oscillator 18 to generate therebetween an acoustical vibratory field at a supersonic frequency of, say, 20,000 c.p.s. directed transversely to the length of the bubble 4b. As the film tubing crosses said field, the walls of the tubing are induced to vibrate at said frequency, whereby any droplets of water adhering to the inner surface of the tubing are dislodged from said surface and fall into the quiet bottom section of the tubing, where they are absorbed by the charge 15. Should the charge not be used, the droplets collect in said quiet bottom section to form a pool.

When the charge 15 becomes loaded with the absorbed liquid, or when the pool reaches a predetermined depth, the extrusion process is stopped for replacing the charge or evacuating the pool, respectively. To that end, several possibilities exist. So, for example, a length of tubing 4 extending from just below the lower pair of pinch rolls 11 (or from just below the die 3) up to just above the transducers 17 can be severed-off. Alternatively, a single severing cut can be made just below the transducers 17 and the contents of the bubble 4b poured away; in the latter case, it is advantageous to support the lower pair of pinch rolls 11 and de-collapsers 13 by mounting means (diagrammatically indicated at 20) capable of being rotated through an angle of 90–100° in the direction of arrows F, whereby the charge 15 or the pool of liquid in the bubble 4b can be poured into a collector placed beside the tank 7.

As a rule, no specific means is necessary, in the apparatus described above, for forming the bubble 4b at the start (or re-start) of the process. All that is necessary is to extrude a length of tubing 4 through the bath 6 up to a location above the de-collapsers 13, than "open" by hand the leading end section of the tubing, pour into it a charge 15 of absorbant (if used) and re-closing the open end just as it reaches the pinch-collapser group 12, 14, whereupon the transducers are switched-on. Since the first few feet of length of the tubing issuing from between the pinch rolls 12 will usually contain droplets of liquid and particles of the absorbant, such a length is severed-off and discarded. It is to be noted that the vibration induced in the bubble 4b are also effective to dislodge from the inner surface of the bubble any particles of the absorbant; this effect is substantially increased by employing the absorbant in a granulated (pelletized) condition.

The tubing path between the pairs of pinch rolls 11, 12 shall not necessarily be vertical; a sub-vertical arrangement (up to about 40–45° to the vertical) can also be adopted, if necessary or unavoidable for any reasons. It is essential, however, for the tubing to travel in an upward direction between the said pairs of rolls and transducers 17 (or other equivalent vibrators), in order that the droplets and any solid particles adhering to the walls of the tubing may fall into that section (bubble bottom) of the tubing which is still to be vibrationally treated. The liquid-saturated absorbant, periodically discharged from the tubing, is collected, regenerated by drying and re-used.

Although polypropylene has been specifically mentioned hereinbefore as thermoplastic material for the film tubing 4, obviously the invention is not bound to this particular resin; other thermoplastic materials, such as vinyl- and vinylidene resins, when extruded into a quenching liquid bath, may be treated in the manner described.

The operating frequency of the vibrators may vary within rather wide limits. Supersonic frequencies of about 20,000 c.p.s. are preferred on account of both their efficiency and "silent" character; however, acoustical frequencies (down to about 500 c.p.s. and even less) may be employed, if desired, despite their relatively lower efficiency and "noisy" character.

The transducers 17 or their equivalent vibrators are preferably arranged in a spaced relation to the film tubing (bubble 4b) passing therebetween, in order to avoid damage to the latter by mechanical contact, and act as "vibration radiators." Generally, a pair of diametrically opposed radiators is sufficient when small-diameter film tubings are processed; otherwise, it is advisable to employ at least two pairs of radiators distributed around the bubble.

Tubular films obtained with the method and apparatus described hereinbefore are completely dry on their inside.

What I claim is:

1. In a process of manufacturing a tubular film of a synthetic thermoplastic material, comprising extruding a film tubing of said material in a heat-softened condition into a quenching liquid bath and pulling said film through said bath in collapsed condition, the improvement comprising pulling the quenched film tubing outside the bath in an upward substantially vertical direction, forming and maintaining a spatially stationary bubble of said tubing extending in said direction, while extruding and pulling the tubing, and applying to said bubble a vibratory field directed substantially transversely to said direction to thereby dislodge any droplets of liquid from the inner surface of the bubble and collect them in a bottom section of the latter.

2. The process of claim 1, comprising applying said vibratory field by radiating vibrations onto an intermediate section of the bubble.

3. In a process of manufacturing a tubular film of a synthetic thermoplastic material, comprising extruding a film tubing of said material in a heat-softened condition into a quenching liquid bath and pulling said film through said bath in collapsed condition, the improvement comprising pulling the quenched film tubing outside the bath in an upward substantially vertical direction, forming and maintaining a spatially stationary bubble of said tubing extending in said direction while extruding and pulling the tubing, maintaining in a bottom section of said bubble a charge of a particulate solid absorbant for the quenching liquid, and applying to a longitudinally intermediate section of the bubble a vibratory field directed substantially transversely to said direction to thereby dislodge any droplets of the liquid from the inner surface of the tubing and precipitate them onto said charge.

4. The process of claim 3, comprising applying said vibratory field by radiating vibrations onto said intermediate section of the bubble.

5. The process of claim 3, wherein the solid absorbant is used in a pelletized form.

6. The process of claim 1, moreover comprising periodically severing the film tubing within the length of the bubble and discharging from the latter the liquid collected in the bottom section of the bubble.

7. The process of claim 3, moreover comprising periodically severing the film tubing within the length of the bubble and replacing the said charge of the absorbant.

8. Apparatus for manufacturing a tubular film of a synthetic thermoplastic material comprising a quenching liquid bath, means for extruding into the bath a film tubing of said material in a heat-softened condition, and a pair of pinch rolls for pulling the tubing out of the bath in a collapsed condition, said apparatus comprising moreover a further pair of pinch rolls defining with said first-mentioned pinch rolls a substantially vertically upwardly directed path for the tubing, and vibration-generating means arranged besides an intermediate section of said path to produce a vibratory field directed substantially transversely of the path.

9. The apparatus of claim 8, wherein the vibration-generating means comprises a pair of electro-acoustical transducers arranged at opposite sides of said intermediate section of said path to radiate vibrations across the latter.

References Cited by the Examiner

UNITED STATES PATENTS

| | | | |
|---|---|---|---|
| 2,291,238 | 7/1942 | Kimmick | 264—70 |
| 2,476,140 | 7/1949 | Francis | 264—95 |
| 3,246,055 | 4/1966 | Pendleton | 264—209 |

ALEXANDER H. BRODMERKEL, *Primary Examiner.*

L. S. SQUIRES, *Assistant Examiner.*